HENRY ALLEY.

Improvement in Bee-Hives.

No. 5,065. Reissued Sep. 24, 1872.

Witnesses.
C. F. Brown
S. J. Royce.

Inventor.
Henry Alley
by H. W. Beadle
Atty

AM. PHOTO-LITHOGRAPHIC CO. N.Y. (OSBORNE'S PROCESS.)

UNITED STATES PATENT OFFICE.

HENRY ALLEY, OF WENHAM, MASSACHUSETTS.

IMPROVEMENT IN BEE-HIVES.

Specification forming part of Letters Patent No. 128,005, dated June 18, 1872; reissue No. 5,065, dated September 24, 1872.

*To all whom it may concern:*

Be it known that I, HENRY ALLEY, of Wenham, in the county of Essex and State of Massachusetts, have invented a new and Improved Bee-Hive; and I do hereby declare that the following is a full and exact description of the same, reference being had to the accompanying drawing and to the letters of reference marked thereon.

This invention relates to that class of bee-hives which are provided with a central brood-chamber having honey-boxes on each side thereof; and consists of certain details of construction which will be fully described hereinafter.

Figure 1:
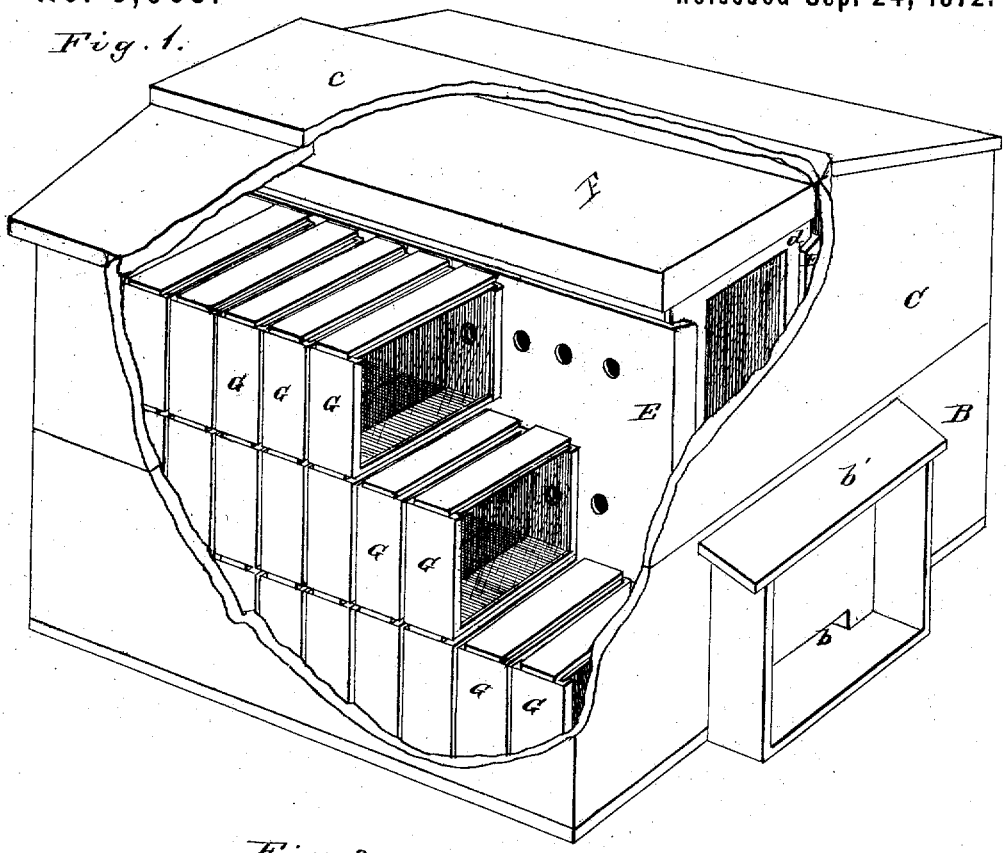
Figure 2:
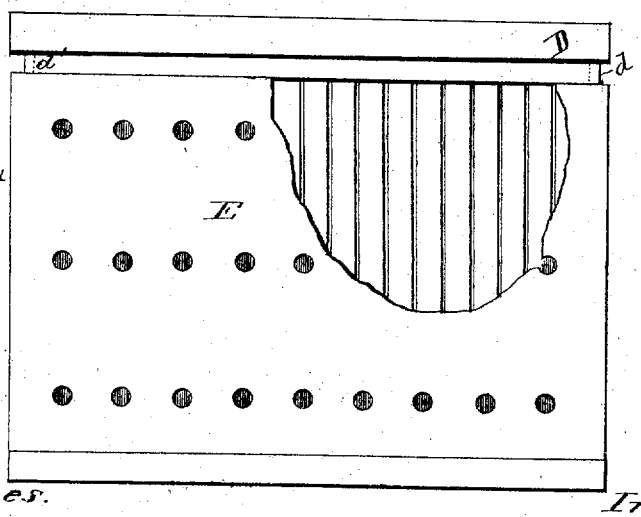

In the drawing, Figure 1 represents a perspective view of the bee-hive complete, a portion of the exterior being broken away to show the interior of the hive; Fig. 2 represents a side elevation of the brood-chamber, with a portion of the removable side broken away to show the comb-frame; and Fig. 3 represents a plan view of the base-board on a reduced scale.

Figure 3:
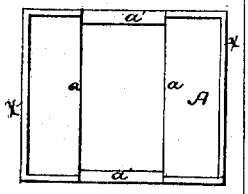

A, Fig. 3, represents the base-board, which is provided with a central recess, formed by the boards *a a* upon each side, and strips *a′ a′* upon the ends, as shown. The boards and strips are so arranged upon the base-board as to form upon the edge a rabbet, *x*, for the reception of the lower division, B, of the case, by which means a tight joint is made between the two. The case is made in two divisions, B and C, the lower of which is provided with an opening, *b*, protected by the porch *b′*, as shown. D, Fig. 2, represents the brood-chamber, consisting of the solid ends *d d′*, (one of which, however, may be formed of glass to permit observations when desired,) which ends are united by cross-bars upon each side at top and bottom, so that the sides are left open and the top and bottom also. This chamber rests in the recess in the base-board, and its front end is provided with an opening corresponding with the opening in the outer case for the reception of the bees. The upper part of the brood-chamber is adapted to receive and hold the bars of the comb-frames, the latter being made removable, and being constructed in the usual well-known manner. E represents side boards, adapted, by means of cross-bars at each end, to be connected to the brood-chamber, as shown. These sides are provided with suitable openings to permit the bees to pass readily from the brood-chamber to the honey-boxes. F represents a cover, which, when in position, rests on the brood-chamber and incloses the same. G represents the honey-boxes, which are simply narrow boxes, preferably provided with removable glass sides, and having at one end an opening adapted to communicate, when the box is in place, with one of the openings in the side boards of the brood-chamber. These boxes are arranged in series, one above the other, the number depending upon the size of the hive.

These surplus honey-boxes, it will be observed, are located at the ends of the frames instead of at their sides, by means of which arrangement the bees are enabled to pass directly into the boxes from between any two sheets of comb in the hive. The board E being removable, the honey-boxes may be set directly against the ends of the comb-frames, if desired.

It will be observed, also, that all or nearly all the parts are removable from each other, and independent, to a certain extent, of each other—that is, the hive may be opened by removing the upper division, and the honey-boxes may be removed without disturbing the brood-chamber containing the comb-frames, or any of the comb-frames may be removed without disturbing the honey-boxes. If desired, also, the entire brood-chamber may be readily removed.

When all the parts are in place, the bees can pass readily from the entrance in beneath the comb-frames, freely through the brood-chamber, and out into the honey-boxes at will.

By means of the movable cover and sides, the bees may be protected in winter by the addition of woolen or other suitable covering.

The hive, as a whole, is exceedingly simple in its construction, and it possesses marked advantages in its practical workings.

I do not claim to have invented a central brood-chamber with communicating honey-boxes on each side, for this feature I know as old; but

Having thus fully described my invention, what I claim as new, and desire to secure by Letters Patent, is—

1. The combination of a hive-chamber having comb-frames arranged as described with sides capable of removal, as and for the purpose set forth.

2. The combination of the brood-chamber, the removable sides, and the honey-boxes G, the sides being provided with orifices adapted to communicate with the openings in the honey-boxes, as described.

3. The construction of a bee-hive to admit the use of surplus honey-boxes at the ends of the frames, substantially in the manner and for the purpose set forth.

HENRY ALLEY.

Witnesses:

RUFUS L. DODGE,

JOHN BRADSTREET.